S. H. Parish.
Shears.
N° 89,498. Patented Apr. 27, 1869.
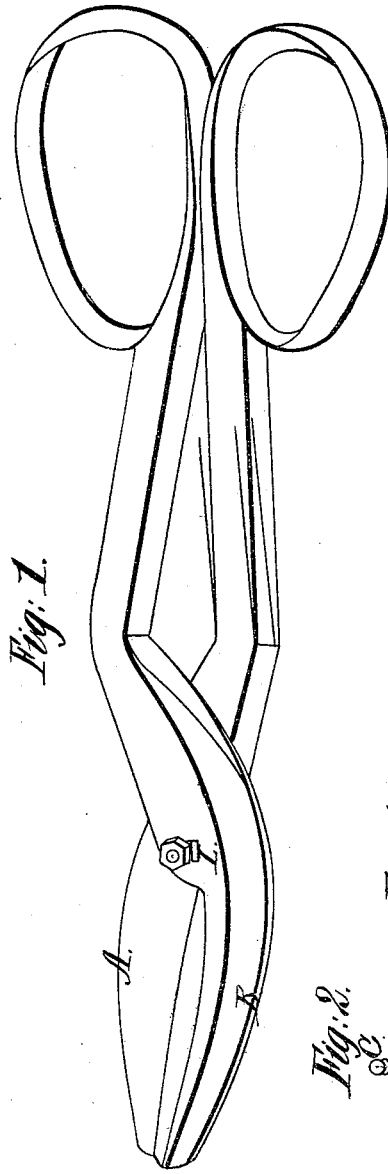
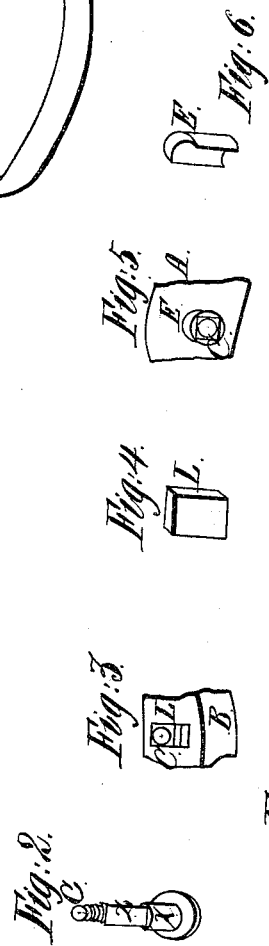
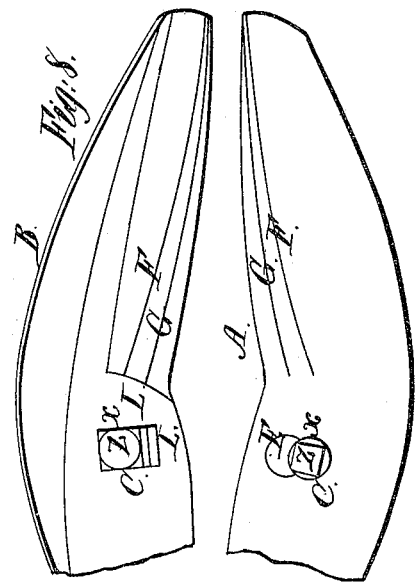
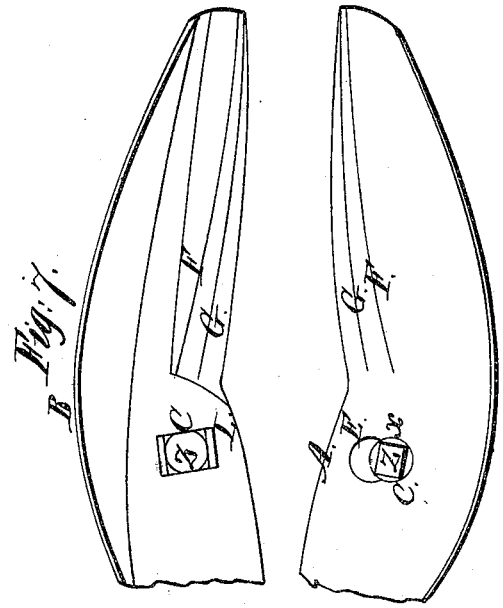
Witnesses:
G. L. Chapin
E. E. Gibson
Inventor:
S. H. Parish

SENECA H. PARISH, OF CHICAGO, ILLINOIS.

Letters Patent No. 89,498, dated April 27, 1869.

IMPROVEMENT IN SHEARS.

The Schedule referred to in these Letters Patent and making part of the same.

*To all whom it may concern:*

Be it known that I, SENECA H. PARISH, of Chicago, in the county of Cook, and State of Illinois, have invented an Improvement in Shears; and I do hereby declare that the following is a full, clear, and exact description thereof, reference being had to the accompanying drawings, and letters marked thereon, making a part of this description, in which—

Figure 1 is a perspective representation of a pair of shears, pivoted together according to my improvement.

Figure 2, the bolt, or pivot.

Figure 3, a broken plan view with the nut removed.

Figure 4, one of the plugs removed.

Figure 5, a view of the opposite side of the shears from that shown at fig. 3.

Figure 6, a perspective view of the curved plug.

Figures 7 and 8 are enlarged views of the blade, showing how the bolt is adjusted.

The nature of the present invention consists in providing shears with an adjustable bolt, whereby, when the blades become much worn by sharpening, they may be so set together as to secure the same angle, relative to the substance to be cut, as when new.

A B represent the blades of shears designed more especially for cutting metal.

Instead of so making the holes through them as to fit a bolt closely, as is usually done, I make a rectangular mortise, or slot, through the blade B, large enough to receive one or more flat plugs, L, at the side of the bolt, and a slot with semicircular ends through the blade A, of such size as to receive one or more curved plugs, E, in addition to the bolt C.

This bolt, fig. 2, has that part $x$ of its length which passes through the blade A made in a cylindrical form, and the part Z, which passes through the blade B, square.

To put new shears together, the bolt C should be put so near the cutting-edges of the blades as the slots will allow, as shown at fig. 1, and the plugs E L so placed in their respective slots as to prevent any lateral motion.

When the blades have become worn, as, for instance, down to the line G, figs. 7 and 8, the plugs L should be removed, and placed on opposite sides of the bolt C, as shown at fig. 7, and the plug E placed at the opposite end of its slot, and at the other side of the bolt.

When the blades are worn down to the line F, both plugs L should be placed at the inside of the bolt C, as shown at fig. 8.

By means of this arrangement, the cutting-edges of the blades A B can be made to present a suitable angle for properly cutting metal, so long as there is sufficient strength of material left in them, notwithstanding their edges be very much ground away, thus providing shears that will last twice as long as those shears that are pivoted with the ordinary bolt, inasmuch as shears that have been much worn present so much cutting-surface to the metal as to be practically inoperative.

It is proper, however, to state here, that in order to bring the points of the shears properly to meet after each adjustment, the handles should be so bent as to make them overlap about one-eighth of an inch. This can be done by any competent person who uses the shears.

I do not confine myself to the number of plugs shown, nor to their precise form, for the object is to set the bolt C back from the cutting-edges of the blades A B, when they become worn off by use, and at the same time secure a strong, easy-working joint.

Having thus described my invention,

What I claim, and desire to secure by Letters Patent of the United States, is—

Shears provided with an adjustable bolt for setting the blades A B together, when they become worn, as set forth.

S. H. PARISH.

Witnesses:
G. L. CHAPIN,
E. E. GIBSON.